(12) United States Patent
Bynum (10) Patent No.: US 8,882,384 B2
(45) Date of Patent: Nov. 11, 2014

(54) COMPACT, HIGHLY-REUSABLE, LOCKING DEVICE

(75) Inventor: Kurt Kevin Bynum, Brighton, MI (US)

(73) Assignee: Moeller Manufacturing Co., Inc., Wixom, MI (US)

( * ) Notice: Subject to any disclaimer, the term of this patent is extended or adjusted under 35 U.S.C. 154(b) by 592 days.

(21) Appl. No.: 13/080,008

(22) Filed: Apr. 5, 2011

(65) Prior Publication Data

US 2011/0255914 A1  Oct. 20, 2011

Related U.S. Application Data

(60) Provisional application No. 61/324,853, filed on Apr. 16, 2010.

(51) Int. Cl.
| | |
|---|---|
| *B25G 3/00* | (2006.01) |
| *B25B 23/14* | (2006.01) |
| *B25B 23/142* | (2006.01) |
| *F16B 39/28* | (2006.01) |

(52) U.S. Cl.
CPC ........... *B25B 23/141* (2013.01); *B25B 23/1427* (2013.01); *F16B 39/28* (2013.01)
USPC .......................................... 403/351; 408/139

(58) Field of Classification Search
USPC ........... 403/109.3, 109.5, 348, 350, 351, 352, 403/366, 322.2
See application file for complete search history.

(56) References Cited

U.S. PATENT DOCUMENTS

| | | | |
|---|---|---|---|
| 4,300,774 A | 11/1981 | Hollis et al. | |
| 4,599,019 A * | 7/1986 | Ueberall | ........................ 408/139 |
| 4,815,276 A | 3/1989 | Hansel et al. | |
| 4,861,201 A * | 8/1989 | Cuilleron | ........................ 408/139 |
| 5,115,636 A | 5/1992 | Zeiser | |
| 5,851,035 A | 12/1998 | Marc et al. | |
| 6,293,595 B1 | 9/2001 | Marc et al. | |
| 6,948,410 B1 * | 9/2005 | Larson | ............................. 81/467 |

\* cited by examiner

*Primary Examiner* — Michael P Ferguson
*Assistant Examiner* — Daniel Wiley
(74) *Attorney, Agent, or Firm* — Peter J. Rashid (57) ABSTRACT

A compact, highly-reusable, locking device includes a carrier, roller elements, a body, and a band spring. The carrier includes a plurality of apertures for receiving each a corresponding roller element. The body includes a plurality of detents separated by ridges. The number of detents is different than the number of roller elements. The body is at least partially received in the carrier such that the detents are in radial alignment with the apertures. The band spring is disposed about the roller elements. The roller elements travel across the detents and ridges to cause elastic deformation of the band spring when the body is rotated about a central axis.

4 Claims, 6 Drawing Sheets

COMPACT, HIGHLY-REUSABLE, LOCKING DEVICE

BACKGROUND OF THE INVENTION

In the aircraft engine industry, for example, many engines include double walled structures, such as compressors and combustors, where the outer and inner walls are respectively provided with a number of borescope holes or ports. One purpose of the borescope ports is to allow inspection and monitoring of the engine. This may be accomplished by inserting inspection equipment, such as borescopes and/or probes, through the borescope ports.

Each borescope port requires a removable borescope plug to facilitate borescope inspection of the engine components through the borescope port. In addition, the borescope plug also performs a sealing function to prevent the leakage of high pressure and high temperature gas through the borescope port. Typically, the borescope ports are threaded holes in the engine cases and the borescope plugs typically screw into the ports. The borescope plugs are required to incorporate a secondary locking feature to prevent them from loosening and/or falling out while the engine is operation.

The secondary locking feature can include a number of different schemes. For example, safety wire (lock wire), tab washers, and cotter clips have been used in early engine designs. As the engine designs matured, it became obvious that locking secondary locking features provided improved reliability and maintainability. Most new engine designs specify locking borescope plugs.

Thus, there is a need to provide a locking device that is highly reusable, robust in function, not prone to damage, contain no sharp edges, no loose parts, and requires no special tools, techniques, or knowledge to operate. Additionally, the device should be compact, lightweight, and easy to manufacture.

BRIEF SUMMARY OF THE INVENTION

Briefly, according to the invention, there is provided a locking device comprises a carrier including a plurality of apertures; a plurality of ball bearings, each ball bearing partially disposed in a corresponding aperture; a body including a plurality of detents separated by ridges, the body at least partially received in the carrier such that the plurality of detents are in radial alignment with the plurality of apertures; and a band spring disposed about the plurality of ball bearings, wherein the plurality of ball bearings travel across the plurality of detents and ridges to cause elastic deformation of the band spring when the body is rotated about a central axis of the body.

In another embodiment, a locking device comprises a carrier including a plurality of apertures, each aperture being conical or stepped in shape for at least partially receiving a corresponding ball bearing; a body including a plurality of detents separated by ridges, the body at least partially received in the carrier such that the plurality of detents are in radial alignment with the plurality of apertures; and a band spring disposed about the plurality of ball bearings, wherein rotation of the body in a first direction causes the plurality of ball bearings and the band spring to rotate in a second, opposite direction.

In yet another embodiment, a locking device comprises a carrier including a plurality of fingers forming a plurality of slots therebetween; a plurality of roller elements, each roller element partially disposed in a corresponding slot; a body including a plurality of detents separated by ridges, the body at least partially received in the carrier such that the plurality of detents are in radial alignment with the plurality of slots; a band spring disposed about the plurality of roller elements; and a sleeve disposed about a portion of the body, the sleeve including a plurality of slots, each slot capable of at least partially receiving a corresponding finger. The plurality of roller elements travel across the band spring to cause elastic deformation of the band spring when the body is rotated in a first direction about a central axis of the body.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
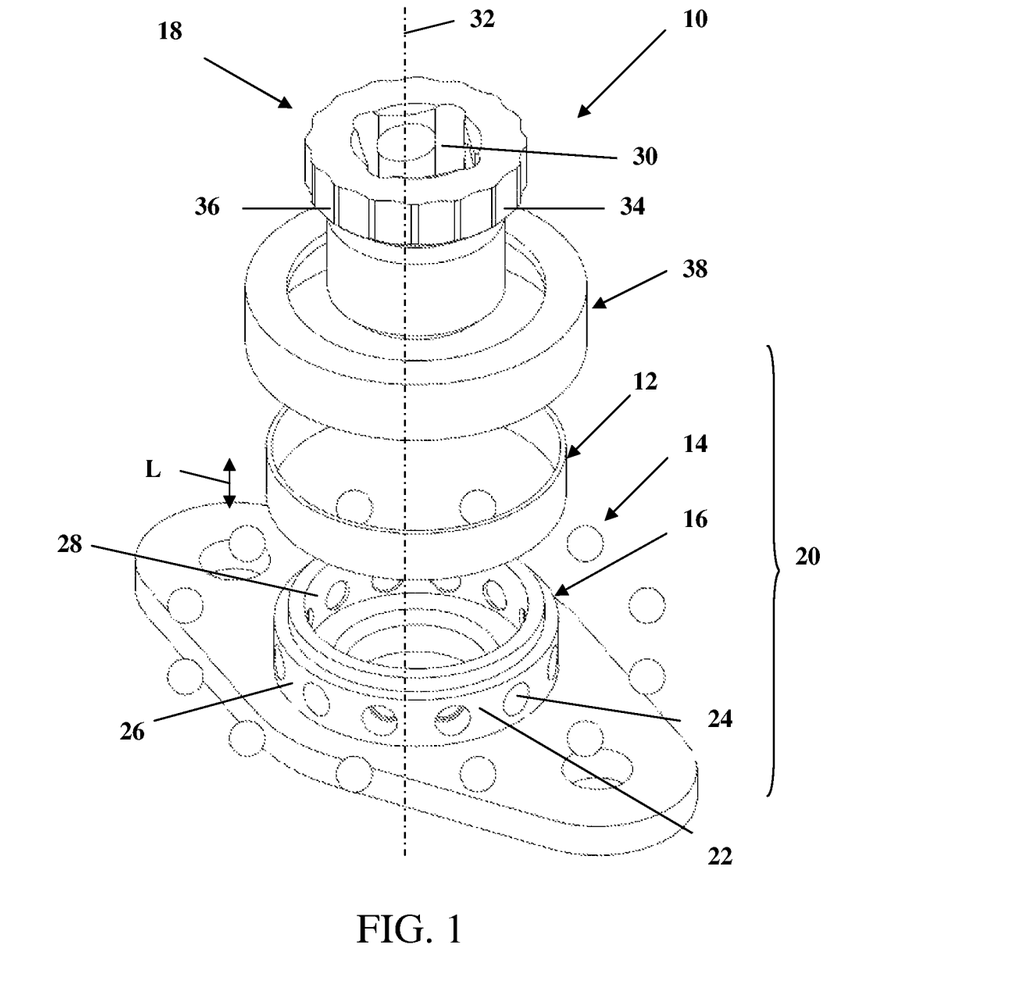
FIG. 1 is an exploded view of a compact, highly-reusable, locking device according to an embodiment of the invention.
Figure 2:
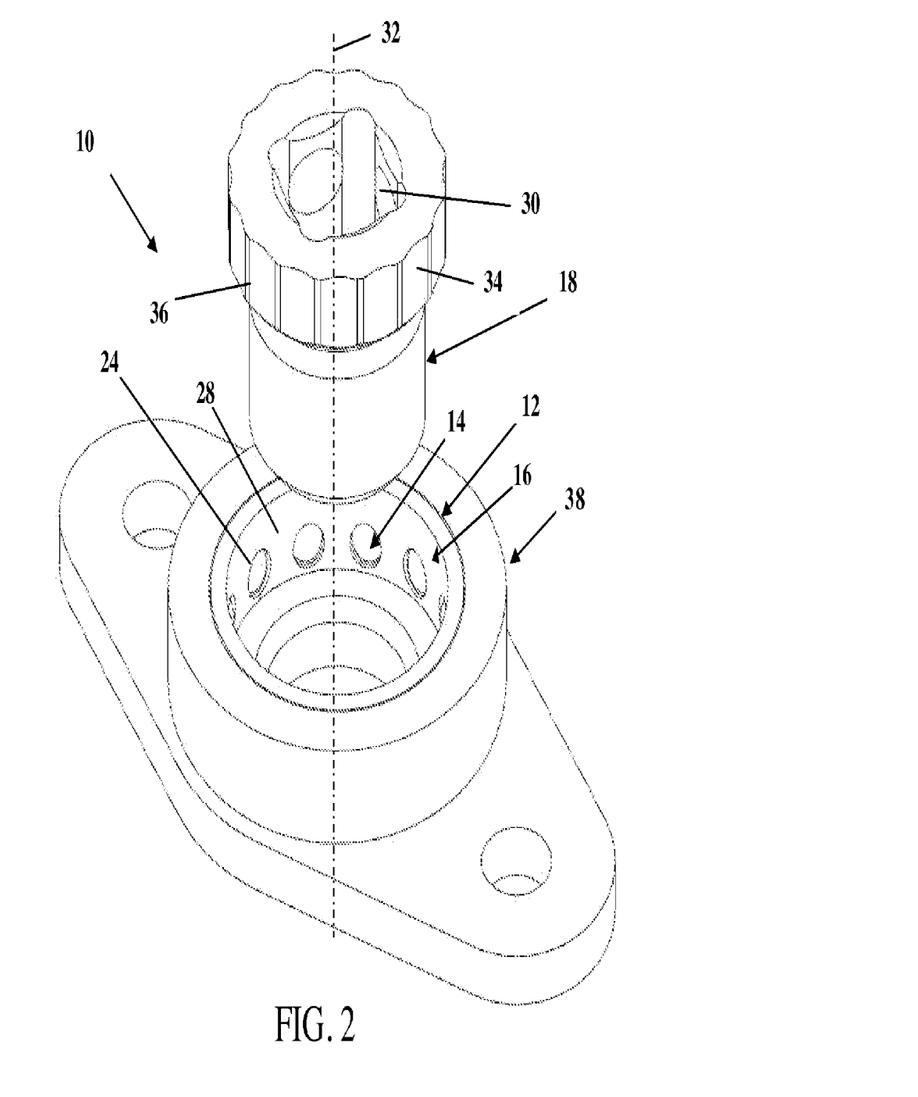
FIG. 2 is a partial exploded view of the locking device of FIG. 1.

Referring now to FIGS. 1 and 2, a compact, highly-reusable, locking device is generally shown at 10 according to an embodiment of the invention. In general, the device 10 includes four major components: a band spring 12, a plurality of roller elements 14, a carrier 16 and a body 18 to actuate the roller elements 14. The band spring 12, the roller elements 14 and the carrier 16 together form a cartridge 20. The cartridge 20 can be attached to or incorporated on a complimentary threaded component (not shown), such as a nut, and the like. In addition, the locking device 10 includes a cover 38 that houses the band spring 12 and other various components of the locking device 10.

The carrier 16 includes an upper, annular portion 22 with a plurality of apertures 24 for holding and positioning the roller elements 14. In one embodiment, each aperture 22 has a slightly larger diameter on the external surface 26 of the upper portion 22 than on the internal surface 28 of the upper portion 22. Specifically, the diameter of each aperture 24 on the external surface 26 is slightly larger than the diameter of each roller element 14 and the diameter of each aperture 24 on the internal surface 28 is slightly small than the diameter of each roller element 14. For ease in manufacturing, the apertures 24 are stepped holes with the larger step being slightly greater than the diameter of the roller element 14, and the smaller step is slightly less than the diameter of the roller element 14. In this manner, each roller element 14 is prevented from passing through each aperture 24 of the carrier 16. In the illustrated, the carrier 16 includes a total of twelve (12) apertures 24 to accommodate a corresponding number of roller elements 14.

It will be appreciated that the invention can be practiced with any desirable number of apertures 24 and roller elements 14, so long as the number of apertures 24 corresponds to the number of roller elements 14.

Figure 3:
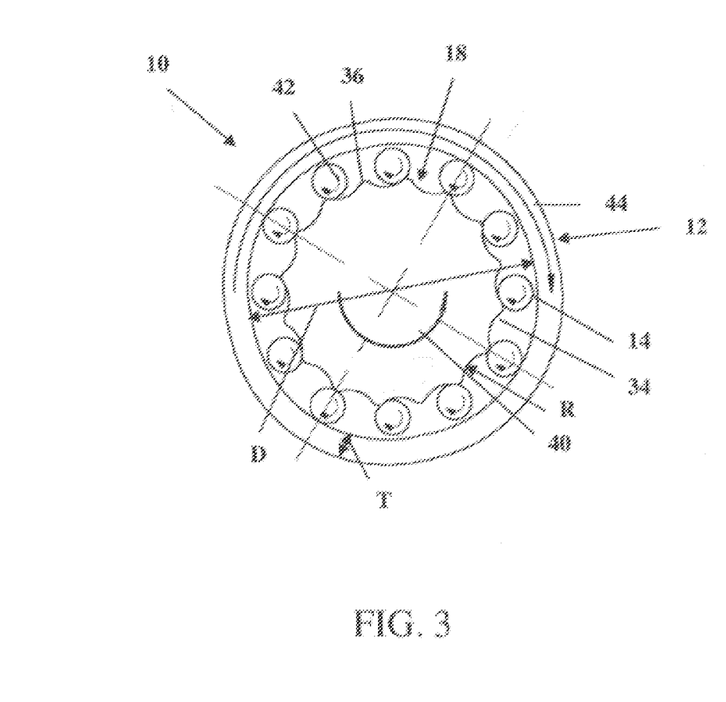
FIG. 3 is a cross-sectional view of the locking device of FIG. 1 when the ball bearings engage the band spring as the body is rotated.

The body 18 includes a head 30 to allow a tool (not shown), such as a wrench, and the like, to rotate the body 18 about a central axis 32 of the body 18. The head 30 could also be an internal drive, such as a standard square recess, Allen socket, splined socket, and the like. The outer circumference of the body 18 includes a plurality of detents 34 having a radius of curvature, R, that are slightly larger the diameter of the roller elements 14 (FIG. 3). The detents 34 are separated by ridges 36 that allow the roller elements 14 to travel from one detent 34 to an adjacent detent 34 when the body 18 is rotated by the tool. The ridges 36 can be considered to be peaks, whereas the detents 34 can be considered to be valleys that are axially oriented in parallel similar to barrels of a gatling gun. As shown in FIG. 2, the body 18 is at least partially received in the carrier 16 such that the plurality of detents 34 is in radial alignment with the plurality of apertures 24 of the carrier 16.

In the illustrated embodiment, the body 18 includes a total of sixteen (16) detents 34, which is greater in number than the twelve (12) roller elements 14 and apertures 24 (i.e., a ratio of detents/roller elements of 16/12=4/3). However, it will be appreciated that the invention can be practiced with a greater number of roller elements 14 (and apertures 24) than the number of detents 34 so long as the number of roller elements 14 and detents 34 are different. For example, the invention can be practiced with a ratio of detents/roller elements of 3/2, 5/3, 5/4, and the like, or 2/3, 3/4, 3/5, 4/5, and the like.

Figure 4:
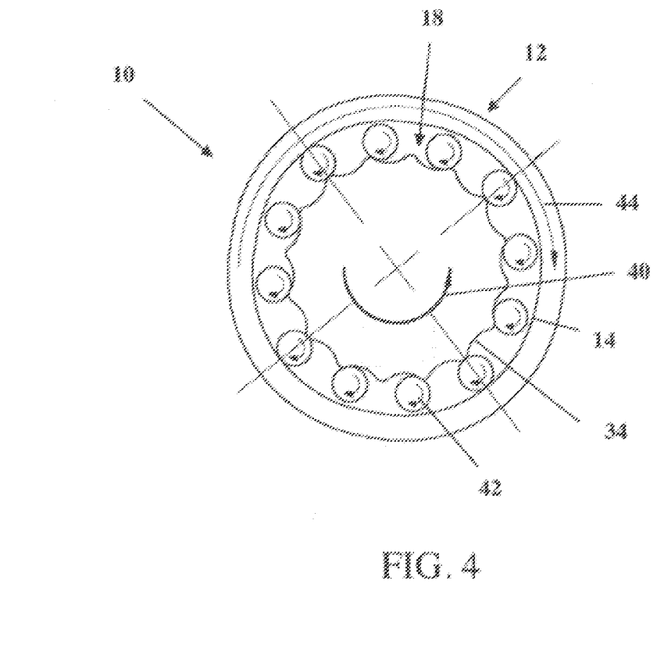
FIG. 4 is another cross-sectional view of the locking device similar to FIG. 3 when the body is further rotated.

Referring now to FIGS. 3 and 4, the operation of the device 10 will now be described. When the tool (not shown) rotates the body 18 in a counterclockwise direction, indicated by the arrow 40, the detents 36 and ridges 36 rotate in an axial (linear) direction causing the roller elements 14 to rotate in an opposite clockwise direction indicated by the arrow 42. In the illustrated embodiment, the roller elements 14 comprise ball bearings of a type well-known in the art. However, it will be appreciated that the invention is not limited by the type of roller element 14, and that the invention can be practiced with any desirable roller element known in the art. The spring sleeve 12 has an inner diameter, D, that is essentially the same as the average distance across directly opposite ball bearings 14 as the ball bearings 14 travel across the detents 34 and ridges 36 of the body 18 such that the spring sleeve 12 engages the ball bearings 14. The amount of force exerted by the spring sleeve 12 against the ball bearings 14 can be varied by changing its material, wall thickness, T, and overall length, L (FIG. 1). In the illustrated embodiment, the band spring 12 has an inner diameter, D, of about 1.015 inches. The rotation of the ball bearings 14 causes the band spring 12 to rotate in the same clockwise direction as the ball bearings 14, indicated by the arrow 44.

As mentioned above, the illustrated embodiment of the device 10 includes a total of twelve (12) ball bearings 14 and a total of sixteen (16) detents 34. It should be noted that the number of ball bearings 14 (and apertures 24) is different than the number of detents 34 in such a way that at any one point of rotation of the body 18, an equal number of ball bearings 14 are in a fully extended position (contacting the apex of the ridges 36), a fully retracted position (resting in the bottom of the detents 34), and an intermediate position (between the apex of the ridges 36 and the bottom of the detents 34). The difference of the dimensions across the ridges 36 and the detents 34 is such that, when the ball bearings 14 are in the fully extended position, the ball bearings 14 are located at a fixed and predetermined distance further apart than when they were in the fully retracted position. In the illustrated embodiment, for example, the distance across directly opposite ball bearings 14 when the ball bearings is in the fully extended position is about 1.030 inches, and the distance across directly opposite ball bearings 14 when the ball bearings 14 are in the fully extended position is about 1.000 inches. Thus, the difference in the distance between the fully extended position and the fully retracted position of two directly opposite ball bearings 14 is about 0.030 inches, or about 0.015 inches for each directly opposite ball bearing 14. In the illustrated embodiment, each ball bearing 14 has a diameter of about 0.125 inches. It has been found that ball bearings having a relatively small diameter enable a compact overall size of the device 10.

In general, the ball bearings 14 move in and out in a radial direction as they interact with the major and minor dimensions of the detents 34. Specifically, in the illustrated embodiment with twelve (12) ball bearings 14 and sixteen (16) detents 34, at any time during rotation of the body 18, four (4) ball bearings 14 are in the fully extended position to produce four (4) high points 90° apart from each other, four (4) ball bearings 14 are in the fully retracted position to produce four (4) low points 90° apart from each other, and four (4) ball bearings 14 are in the intermediate position. These high points and low points travel along the inner diameter of the band spring 12 as the body 18 is rotated, as shown in FIGS. 3 and 4. As a result, stresses on the band spring 12 causes by the engagement of the ball bearings 14 against the band spring 12 are minimized.

When rotated by the tool, the axial motion of the body 18 allows the body 18 to engage or disengage the ball bearings 14, depending on how many turns and the direction of rotation that the body 18 has being rotated by the tool. When the detents 34 are moved axially away from the ball bearings 14, all the ball bearings are in the fully retracted position, and therefore no tension is exerted by the ball bearings 14 against the band spring 12. Thus, it is possible for the threaded components to be easily started and screwed together for a number of turns before the band spring 12 engages the ball bearings 14.

In the illustrated embodiment, the cartridge 20 has an overall axial length of about 0.200 inches, which is about one-half the axial length of conventional locking borescope plugs. Because the axial length, L, of the cartridge 20 is minimal, the device 10 facilitates a similarly minimal axial length envelope for the mating threaded part (not shown).

As described above, a compact, highly-reusable, locking device prevents threaded components, such as turbine engine borescope plugs, from inadvertently loosening. When engaged, the locking device creates a "ratcheting" prevailing torque. The amount of torque is ore than sufficient to prevent loosening due to mechanical vibration, thermal cycling, pressure pulsation, acoustic inputs, and the like. However, the prevailing torque does not interfere with normal tightening that would be done with a wrench.

The device 10 of the invention includes several unique and novel aspects. In one aspect, the prevailing torque friction is transmitted by a plurality of roller elements 14, as opposed to ratchet teeth or beam springs of conventional locking devices. In another aspect, the roller elements 14 roll in the device 10 of the invention, rather than rub, thereby minimizing wear. In yet another aspect, a band spring 12 is provided to energize the roller elements 14 in the device 10, as opposed to more conventional coil, wave, or Belleville springs. The band spring 12 does not stretch or compress, but slightly distorts in shape (i.e., elastically deforms) as the ball bearings 14 move radially in and out as they travel across the detents 34 and ridges 36 of the body 18. Because the band spring 12 does not stretch or compress, the stresses in the band spring 12 are much lower than with conventional springs. In addition, the band spring 12 is retained only in the axial direction, and is free to rotate as the ball bearings 14 engage the band spring 12, thereby minimizing wear.

The device 10 of the invention can accommodate a variety of thread sizes by correspondingly increasing or decreasing the diameter of the body 18 and cartridge 20. Accordingly, the number of ball bearings 14 and detents 34 can be increased or decreased, or maintained the same by changing the arc lengths between them. If the number of ball bearings 14 and detents 34 is kept constant, as the carrier diameter (and radius) increase, the prevailing torque generated will increase in a corresponding manner. In addition, the prevailing torque can be further adjusted to the desired level by changing the wall thickness, T, and axial length, L, of the band spring 12, the profile (and thus the ball radial movement) of the body 18, and the number of ball bearings 14 and detents 34.

Referring now to FIGS. 5-8, a compact, highly-reusable, locking device is generally shown at 100 according to an alternate embodiment of the invention. Similar to the locking device 10, the locking device 100 includes a band spring 102, a plurality of roller elements 104, a carrier 106 and a body 108 to actuate the roller elements 104. In addition, the locking device 100 includes a sleeve 110, a wave spring 112 and a cover 114 that houses the various components of the locking device 100.

Figure 5:
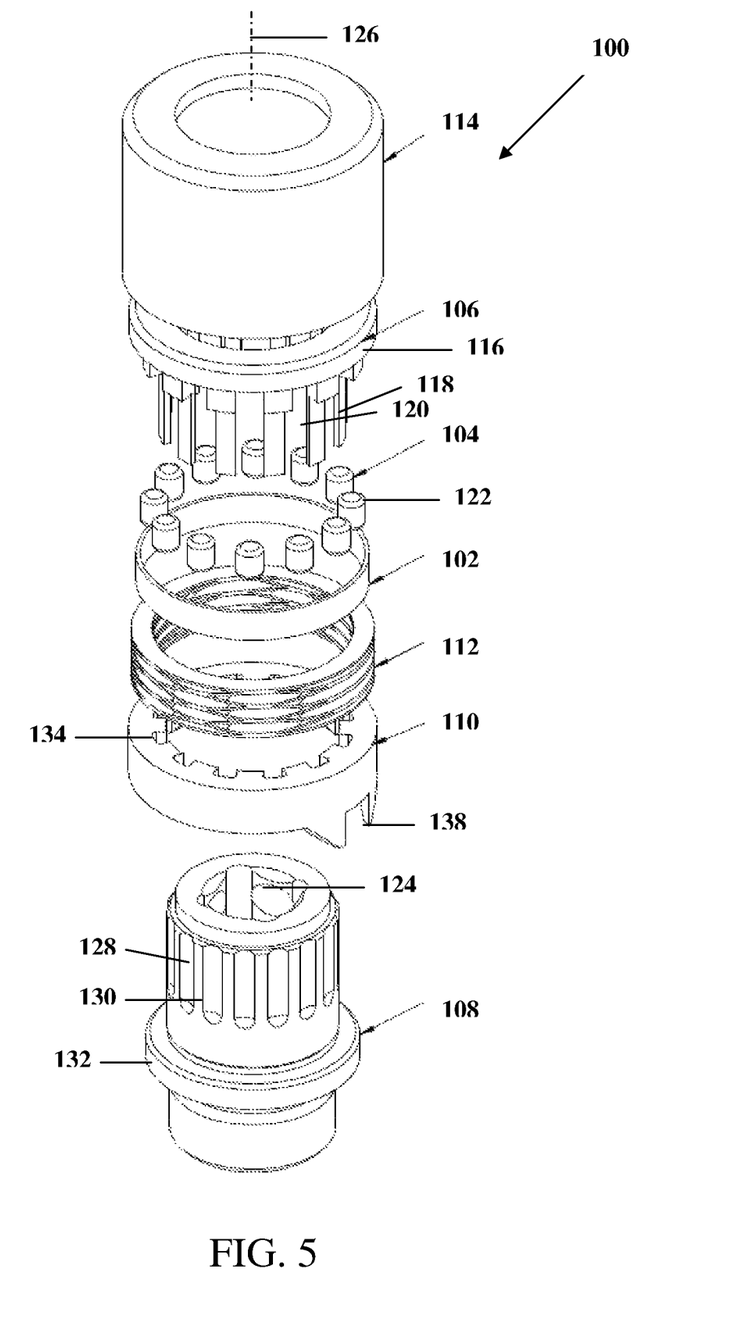
FIG. 5 is an exploded view of a compact, highly-reusable, locking device according to an alternate embodiment of the invention.
Figure 6:
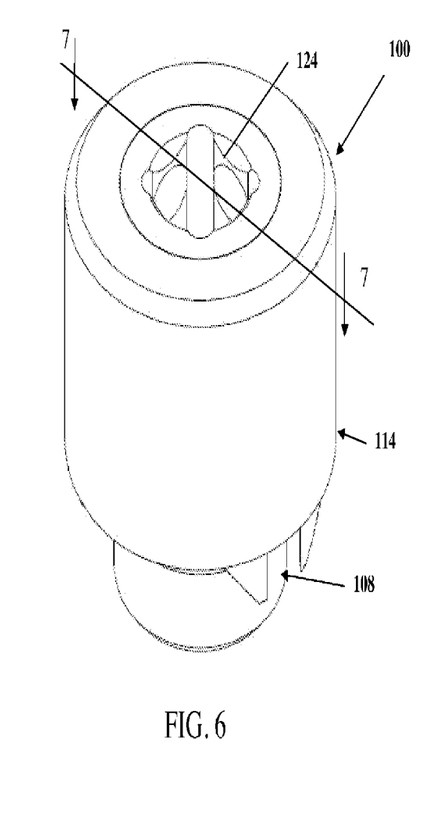
FIG. 6 is a perspective view of the locking device of FIG. 5 when assembled.

The carrier 106 includes an upper, flange portion 116 and a plurality of downwardly extending fingers 118 forming a plurality of slots 120 therebetween for holding and positioning the roller elements 104. As can be understood, the slots 120 of the carrier 106 perform a similar function as the apertures 24 of the carrier 16. However, it will be noted that the apertures 24 of the carrier 16 need to be drilled, whereas the slots 120 do not require drilling and are easier to manufacture than apertures 24. The number of fingers 118 (and slots 120) corresponds to the number of roller elements 104. The width of each slot 120 is slightly smaller than the diameter of each roller element 104. In this manner, each roller element 104 is prevented from passing through each slot 120 of the carrier 106. In the illustrated, the carrier 106 includes a total of twelve (12) slots 120 to accommodate a corresponding number of roller elements 104. It will be appreciated that the invention can be practiced with any desirable number of slots 120 and roller elements 104, so long as the number of slots 120 corresponds to the number of roller elements 104.

As mentioned earlier, the roller elements 14 of the locking device 10 comprise ball bearings. It should be noted that, instead of the ball bearings 14 in the locking device 10, the roller elements 104 in the locking device 100 are generally cylindrical in shape having radiused ends 122.

Figure 7:
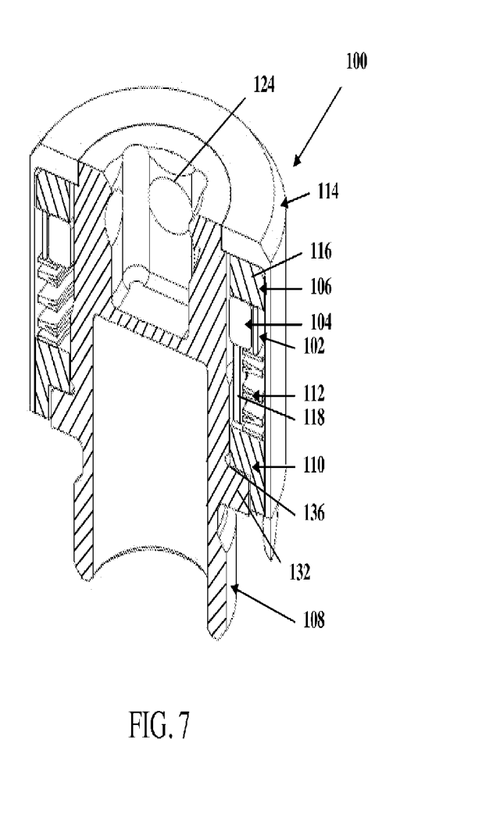
FIG. 7 is a cross-sectional view of the locking device taken along line 7-7 of FIG. 6.

The body 108 includes a head 124 to allow a tool (not shown), such as a wrench, and the like, to rotate the body 108 about a central axis 126 of the body 108. Unlike the head 30 of the locking device 10, the head 124 is an internal drive, such as a standard square recess, Allen socket, splined socket, and the like. The upper portion of the body 108 includes a plurality of detents 128 having a radius of curvature, R, that are slightly larger the diameter of the cylindrical roller elements 104. The detents 128 are separated by ridges 130 that allow the roller elements 104 to travel from one detent 128 to an adjacent detent 128 when the body 108 is rotated by the tool. It should be noted that the detents 128 are radially aligned with the fingers 118 when the locking device 100 is assembled, as shown in FIG. 7. The lower portion of the body 108 includes a flange 132 that engages the sleeve 110 when the locking device 100 is assembled.

In the illustrated embodiment, the body 108 includes a total of sixteen (16) detents 128, which is greater in number than the twelve (12) roller elements 104 and slots 120 (i.e., a ratio of detents/roller elements of 16/12=4/3). However, it will be appreciated that the invention can be practiced with a greater number of roller elements 104 (and slots 120) than the number of detents 128 so long as the number of roller elements 104 and detents 128 are different. For example, the invention can be practiced with a ratio of detents/roller elements of 3/2, 5/3, 5/4, and the like, or 2/3, 3/4, 3/5, 4/5, and the like.

Figure 8:
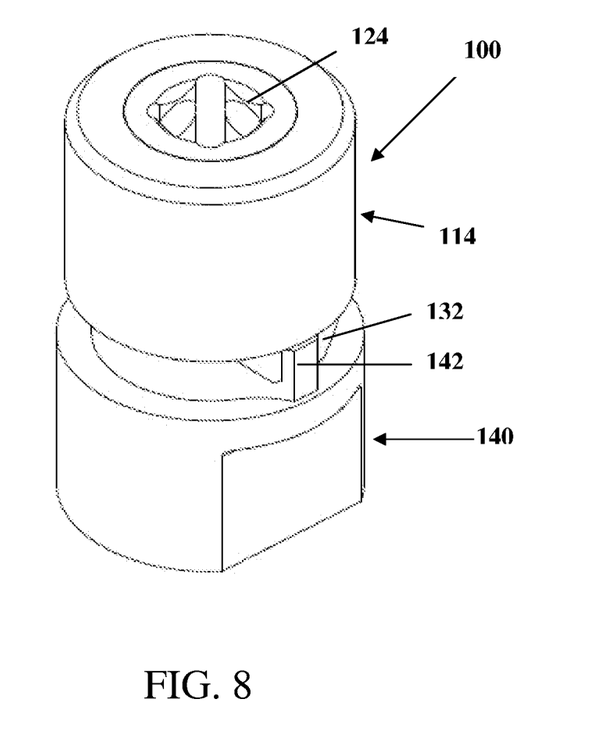
FIG. 8 is a perspective view of the locking device of FIG. 6 when mounted on a borescope port.

The locking device 100 also includes a sleeve 110 with a plurality of slots 134 formed on the inner surface of the sleeve 110. The number of slots 134 corresponds to the number of fingers 118 such that each finger 118 can be at least partially received in a corresponding slot 134. As seen in FIG. 7, the sleeve 110 is substantially L-shape in cross-sectional shape in which an inner diameter flange portion 136 of the sleeve 110 engages the flange 132 of the body 108 when the locking device 100 is assembled. The sleeve 110 may include a slot 138 formed on the lower portion of the sleeve 110. The purpose of the slot 138 is to engage a tab or lug 142 proximate a borescope port 140 to prevent rotation of the locking device 100 when the head 124 is rotated by the tool. Thus, the slot 138, in combination with the tab or lug 142, provides an anti-rotation feature for the locking device 100. It will be appreciated that the invention is not limited by the use of a slot to engage the tab or lug, and that the invention can be practiced with other known means to engage the tab or lug. For example, the slot can be replaced with a female hex, a Double-D, or a number of other forms that could be complimentary to the form proximate the borescope port.

When assembled, the wave spring 112 is disposed between the sleeve 110 and the band sleeve 102, roller elements 104 and flange portion of the carrier 106. As a result, the wave spring 112 provides a biasing force to press the inner diameter flange portion 136 of the sleeve 110 against the flange 132 of the body 108. In addition, the wave spring 112 provides a biasing force to press the band sleeve 102 against the flange portion 116 of the carrier 106. It will be appreciated that the invention is not limited by the use of a wave spring to provide the biasing force against the various components, and that the invention can be used with any desirable means that is well-known in the art for providing a biasing force against the various components.

In operation, the locking device 100 acts slightly differently than the locking device 10. In the locking device 100, the detents 128 of the body 108 do not move axially through the roller elements 104 as in the locking device 10, but rather the detents 128 are always engaged with the roller elements 104. In other words, the plurality of roller elements 104 travel across the band spring 102 to cause elastic deformation of the band spring 102 when the body 108 is rotated in a first direction about the central axis 126 of the body 108. As a result, the locking device 100 is wholly self-contained.

It will be appreciated that the locking device 10, 100 of the invention can be used for other applications other than borescope plugs. For example, the locking device 10, 100 can be used various separable connectors, such as those used in electrical, fluid, hydraulic, and pneumatic lines, mechanical fasteners, such as nuts and bolts, and adjustable linkages in which a jam nut must be prevented from loosening. The locking device 10, 100 of the invention can also be used as a torque limiting device or clutch in a power train.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A locking device, comprising:
    a substantially annular carrier including a plurality of apertures spaced around a periphery thereof;
    a plurality of roller elements, each roller element partially disposed in a corresponding aperture of the plurality of apertures;
    a substantially cylindrical body including a plurality of detents separated by ridges about a periphery thereof, the body at least partially received in the carrier such that the plurality of detents are in axial and radial alignment with the plurality of apertures; and
    a band spring encircling the carrier and the plurality of roller elements,
    wherein the plurality of detents is different in number than the plurality of roller elements and apertures, and
    wherein rotation of the body within the carrier in a first direction causes the plurality of roller elements to roll across the plurality of detents and ridges in such a way that, at any time during rotation of the body, some of the roller elements are in a fully extended position by engaging one of the plurality of ridges, and some of the roller elements are in a fully retracted position by engaging one of the plurality of detents, to thereby cause both elastic deformation of the band spring and rotation of the band spring in a second direction, opposite the first direction.

2. The locking device according to claim 1, wherein the number of detents is greater than the number of roller elements and apertures.

3. The locking device according to claim 1, wherein the number of detents is less than the number of roller elements and apertures.

4. The locking device according to claim 1, wherein the plurality of apertures are conical or stepped in shape.

* * * * *